Sept. 25, 1956  V. R. PAOLUCCI  2,764,249
HYDRAULIC BRAKE AND JACK COMBINATION UNIT
CONTROL DEVICE FOR VEHICLE
Filed Aug. 23, 1952  2 Sheets-Sheet 1

INVENTOR.
VINCENT R. PAOLUCCI
BY Hudson, Boughton,
Williams, Davis & Hoffman
ATTORNEYS

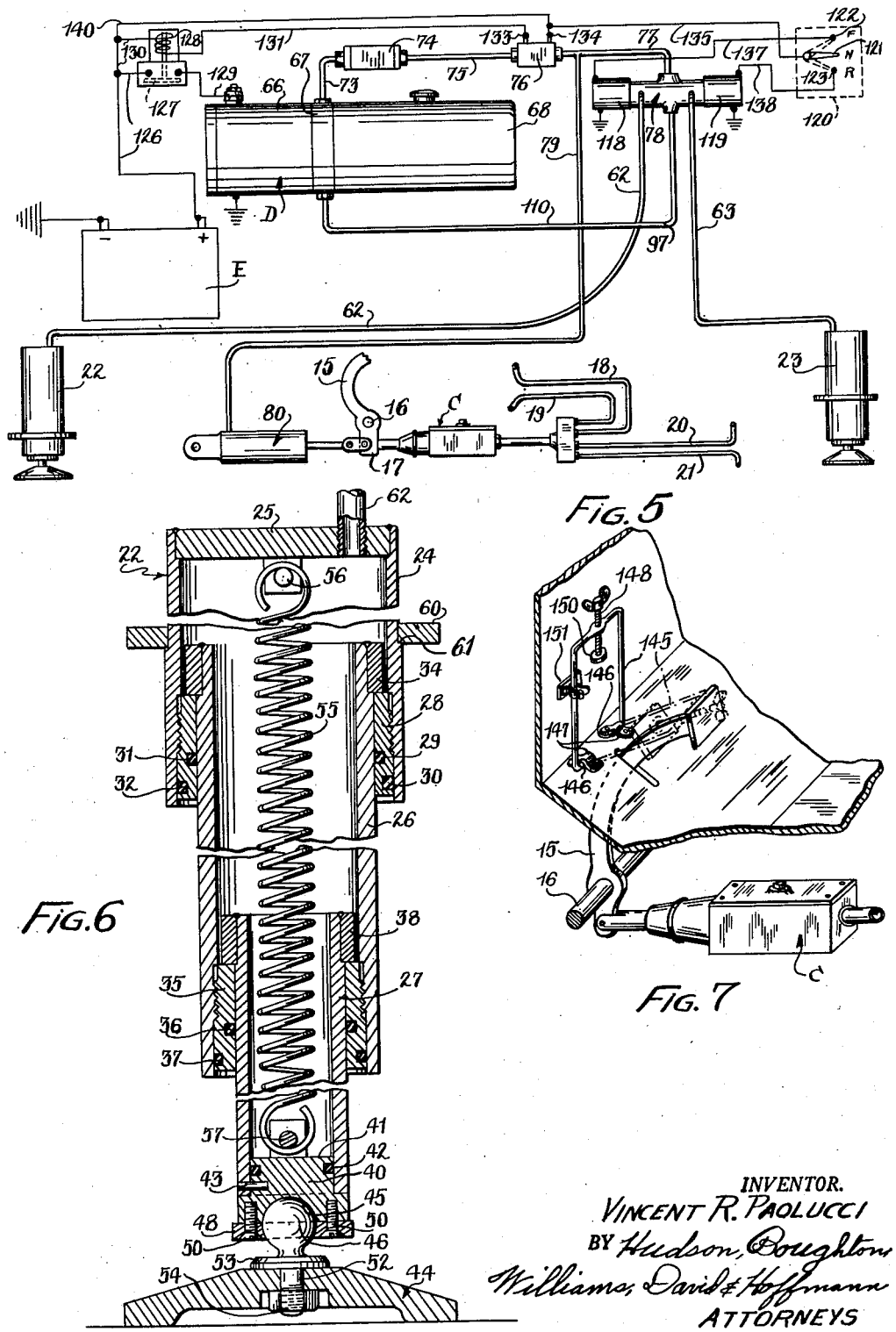

2,764,249
HYDRAULIC BRAKE AND JACK COMBINATION UNIT CONTROL DEVICE FOR VEHICLE

Vincent Ronald Paolucci, South Euclid, Ohio

Application August 23, 1952, Serial No. 305,992

2 Claims. (Cl. 180—82)

The present invention relates to hydraulic brake and jack combination unit control devices for vehicles.

The principal object of the present invention is the provision of a novel and improved, hydraulic brake and jack combination unit control device for vehicles, which device includes front and rear, centerline mounted, hydraulic jacks having telescoping cylinders with internal tension springs for returning the jacks to raised positions, electric motor-driven fluid pump for supplying fluid for actuating the jacks and braking system of the vehicle, a key-controlled, three-position switch connected to a solenoid operated valve movable to one of two positions to start the pump motor and selectively connect the jacks with the fluid pressure pump and to the third position to bleed the jacks and release the brakes, a fluid pressure operated switch to stop the pump motor when the selected jack is in lowered position, a check valve to retain the jack in lowered position until the key control is actuated to bleed the jack and brake system, whereby opposite ends of the vehicle may be selectively raised and lowered and the vehicle brakes automatically applied and released upon manual control of the key-controlled switch.

The invention resides in certain novel constructions and combinations and arrangements of parts and further objects and advantages will be apparent to those skilled in the art to which it relates from the following description of the preferred embodiment described with reference to the accompanying drawings forming a part of this specification in which similar reference characters designate like parts, and in which, Fig. 1 is a sectional view of a passenger automobile embodying the invention;

Fig. 5 is a diagrammatic view showing the actuating and control mechanisms and parts of the automobile braking system;

Fig. 6 is a sectional view of one of the jacks and

Fig. 7 is a perspective view of an alternative arrangement for maintaining the brake pedal depressed.

Figure 1:
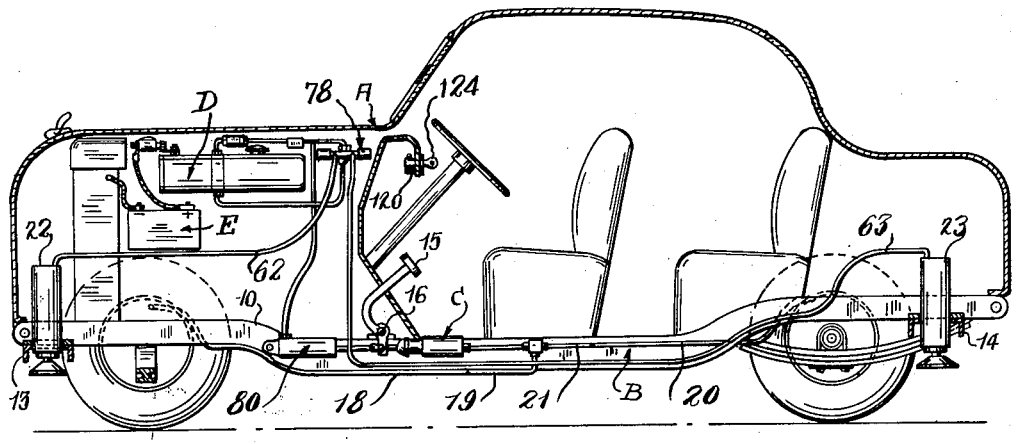

While the invention pertains to various types of vehicles, it is herein shown and described as embodied in a passenger type automobile, designated generally as A. The automobile is of conventional construction and includes a frame B comprising two longitudinally extending side members 10, 11 interconnected by suitable cross members including two transverse channel-shaped members 13, 14 at the front and rear ends thereof, respectively. The frame B is supported on suitable springs connected to the axles in a manner well known in the art.

The automobile A includes a conventional braking system of the hydraulic type and comprises a reservoir and plunger mechanism C actuated by a brake pedal 15 pivotally supported on a rod 16 attached to the frame B and connected to the reservoir and plunger mechanism C by an extension 17 on the pedal 15 to force fluid through conduits 18, 19, 20, 21 to the brake mechanisms located at the four wheels in the manner well understood in the art. Alternatively, any other suitable braking system could be employed.

In the preferred form of the invention, lift jacks 22, 23, are located at the front and rear of the vehicle. These jacks extend through openings in the central portions of the cross members 13, 14 respectively. Each of the jacks comprises an outer cylinder 24 closed at the top by a plate 25 welded therein, and having telescoping pistons 26, 27 movable thereinto. The lower end of the cylinder 24 is threaded and has a bushing 28 screwed therein. The bushing 28 has inner and outer grooves 29, 30 containing suitable sealing rings 31, 32, the latter of which forms a fluid tight seal between the bushing and cylinder walls.

The piston 26 comprises a tubular member slidingly fitting in bushing 28 and having a collar 34 welded about the upper end thereof which is adapted to abut the upper edge of the bushing to limit movement of the piston outwardly of the cylinder 24. The sealing ring 31 provides a fluid tight seal between the bushing and piston. The lower end of the piston 26 is threaded and a bushing 35, which may be similar to the bushing 28, is threaded therein and has inner and outer grooves containing sealing rings 36, 37, the latter of which forms a fluid tight seal between the bushing and walls of the piston 26.

The piston 27, which also comprises a tubular member, has a sliding fit in the bushing 35, and a collar 38 welded about the upper end thereof is adapted to abut the upper end of the bushing 35 to limit movement of the piston 27 outwardly of the piston 26. The ring 36 prevents escape of fluid between the bushing 35 and piston 27.

The lower end of the piston 27 is closed by a plug 40 which has a reduced portion 41 fitting snugly therein and which is grooved to contain a sealing ring 42 for preventing the escape of fluid between the piston and the plug. The plug is secured in place by a pin 43 driven through an opening in the side of the piston 27 and extending into an aligned opening in the plug.

A foot plate 44 is swivelly attached to the bottom of plug 40 by a ball and socket comprising a semispherical socket 45 in the plug which receives a ball-like member 46 attached to the foot plate. The ball member 46 is secured in the socket 45 by a split ring 48 attached to the plug 40 by bolts 50 and which ring provides annular shoulders that engage the member 46 and prevent its removal from the socket. The foot plate 44 has a circular base adapted to rest upon the ground or other supporting surface and a raised central portion having an opening through which a threaded stem 52, integral with the member 46 and having a flange 53 thereon, projects. A nut 54 threaded onto the stem 52 retains the foot plate 44 against the flange 53. It will be seen that the swivel connection between the piston 27 and the foot plate 44 permits the foot plate to rest flat with respect to surfaces inclined relative to the axis of the piston, the purpose of which will appear hereinafter.

The pistons 26, 27 are normally biased to their raised positions or telescoped within the cylinder 24 by a tension spring 55 having one end connected to a pin 56 attached to the plate 25 and the opposite end connected to a pin 57 secured to a part of the plug 40.

Figure 2:
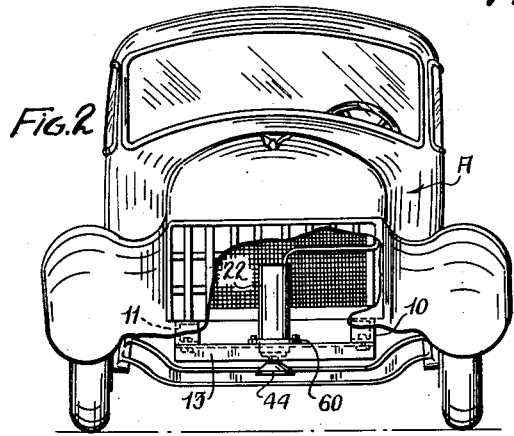
Fig. 2 is a front elevational view, with parts broken away, of the automobile shown in Fig. 1.
Figure 3:
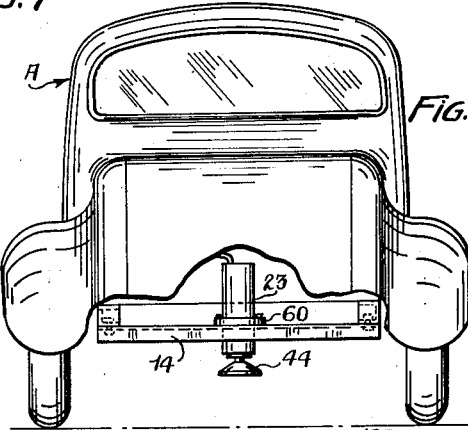
Fig. 3 is a rear elevational view, with parts broken away, of the automobile shown in Fig. 1.

The cylinder 24 has a collar 60 welded against a shoulder 61 formed thereabout, which collar has bolt openings for bolting the jack to its respective supporting frame member 13 or 14 when the units are placed in the openings through the members, as previously described. While the construction of the jacks 22, 23 are alike in most respects, the collars 60 thereof are located at different positions longitudinally of the cylinders 24 so that the foot plates 44 will normally be carried at approximately the same levels for the front and rear jacks although the rear support member 14 is higher than the corresponding front support member 13, as may be seen in Figs. 2, 3.

The telescoping pistons 26, 27 of the jack 22 are adapted to be moved outwardly by fluid pressure introduced into the cylinder 24 thereof through a conduit 62 attached in an opening through the head plate 25. When the pistons 26, 27 are fully extended as shown in Fig. 6, the foot plate 44 will have engaged the ground thereby causing the cylinder 24 to raise upwardly and elevate the frame of the vehicle sufficiently to raise the front wheels from the ground, to permit the wheels to be changed, as in the case of a flat tire, or to dislodge the wheels from snow, ruts, etc. Fluid pressure is similarly directed into cylinder 24 of the rear jack 23 through a conduit 63 attached in an opening through head plate 25 of the jack, to cause the jack 23 to raise the rear wheels from the ground in the manner described with reference to the front wheels.

The fluid pressure for actuating the jacks is provided by a combination motor driven pump and reservoir structure D which may be of conventional form commercially available and which is suitably supported beneath the engine hood of the automobile or at any other convenient location. The structure D preferably comprises a six volt electric motor 66 connected with a fluid pump 67 and a fluid reservoir 68 attached to one side of the pump and in communication with the pump intake. The motor 66 is preferably energized by current supplied by the storage battery E of the automobile.

The pump 67 is operative to withdraw fluid from the reservoir 68 and direct it through a pipe 73 and a check valve 74, thence through a pipe 75 to the pressure sensitive element of a suitable pressure responsive switch 76. The outlet of the pressure responsive element of the switch 76 has a pipe 77 connected therewith which leads to the intake port of a solenoid operated four-way valve 78 operative to control the flow of fluid to and from the jacks.

A pipe 79 is connected with pipe 77 and leads to a fluid motor 80 operative to actuate the brake mechanism of the automobile. The motor 80 comprises a cylinder 83 having a head 84 in one end which has a passage therethrough into which the end of pipe 79 is connected, and a piston 85 reciprocable in the cylinder. The opposite end of the cylinder is closed by a plug 87 having one peripheral edge thereof resting against a shoulder in the cylinder and the opposite edge engaged by an expander retaining ring 88.

Figure 4:
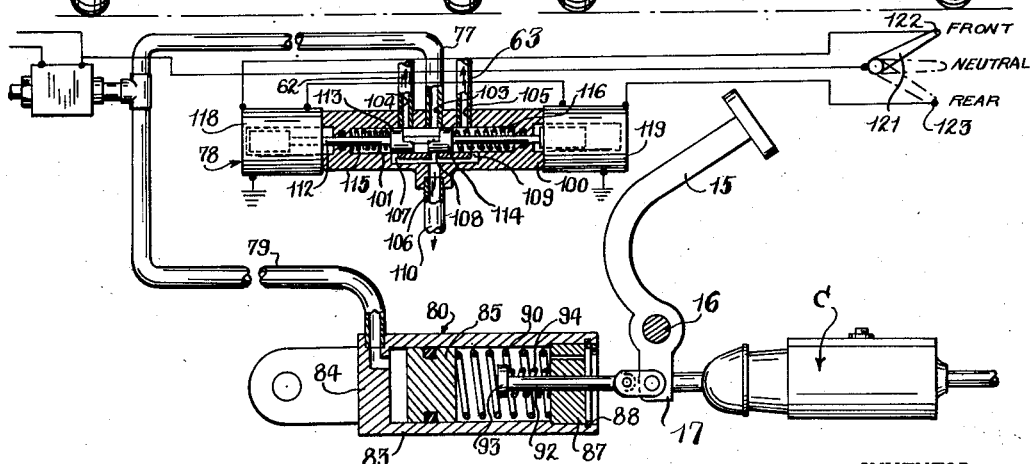
Fig. 4 is a schematic view showing certain parts of the control mechanism.

The piston 85 is normally urged toward the head 84 by a compression spring 90 interposed between the piston and plug 87. It will be seen that whenever the pump 67 is operated to force fluid through pipe 73, etc. fluid is directed into the cylinder 83 and forces piston 85 to the right as viewed in Fig. 4.

The motor 80 is disposed adjacent to the brake pedal 15, and a plunger 92, having one end thereof connected to the brake pedal, projects into the cylinder 83 and is arranged to be engaged by the piston 85 and moved axially to the right and actuate the brake pedal and in turn the reservoir and plunger mechanism C to apply the brakes when fluid under pressure enters the cylinder. The plunger 92 has a head 93 at the end thereof inside the cylinder and a coil spring 94 reacts against the head and the plug 87 to normally urge the plunger to the left and release the brakes when the fluid pressure is relieved. The arrangement shown provides a lost motion connection between the piston 85 and plunger 92 so that when the brake pedal 16 is normally operated by the car operator the piston remains stationary.

The four way valve 78 may be of any well known construction; as shown it comprises a body 100 having a cylindrical chamber 101 provided with an inlet port 103, to which the pipe 77 is connected, outlet ports 104, 105, to which pipes 62, 63 are connected respectively, and an exhaust port 106 having branches 107, 108, 109 opening into the chamber. The exhaust port 106 has a pipe 110 connected therewith which leads to the reservoir 68. A valve rod 112 reciprocates in the chamber and has two valve members 113, 114 attached thereto. Springs 115, 116 normally maintain the valve rod in a neutral position with the valve members between the inlet port 103 and the respective outlet ports 104, 105. In this position the inlet and outlet ports are in communication with the exhaust port 106. The valve rod is adapted to be shifted in opposite directions by solenoids 118, 119 which are attached to opposite ends of the body 100 and which when energized exert an outward pull on armatures attached to the ends of the valve rod projecting through packings in openings through the ends of the chamber walls.

When solenoid 118 is energized the valve rod 112 is moved to the left so that fluid entering inlet 103 is directed to the outlet port 104 and the passage of fluid to port 105 is blocked by valve member 114. The exhaust openings 107, 108 are blocked by members 113, 114, respectively. Likewise, when solenoid 119 is energized the valve rod 112 is moved to the right causing fluid to flow from the inlet port through the outlet port 105 and blocking flow to outlet 104 and the exhaust openings 108 and 109. From the foregoing it will be evident that by energizing solenoid 118 fluid is directed through pipe 62 to the cylinder 24 of the front jack 22 and by energizing solenoid 119 fluid is directed through pipe 63 to the rear jack 23. When both solenoids are deenergized, the valve rod returns to its neutral position and fluid may pass from either of pipes 62, 63 to the return pipe 110 and to the reservoir 68.

The control system for the motor 66 and solenoids preferably comprises a three-way switch 120 which may be attached to the instrument panel of the automobile and which includes a movable contact 121 swingable to engage fixed contacts 122, 123 individually and adapted to be set in a neutral position intermediate the fixed contacts. Preferably, the contact 121 of the switch 120 is operated by a key 124.

The motor 66 is energized by movement of contact 121 to either of the contacts 122, 123 and the motor circuit comprises the positive terminal of battery E, wire 126, contactor 127 which is adapted to be closed by the energization of a solenoid 128, cable 129, motor 66, to ground. The circuit for solenoid 128 comprises wires 126, 130, solenoid 128, wire 131, terminals 133, 134 of the normally closed pressure switch 76, wire 135, contact 121, either contact 122 or 123 and the respective wires 137, 138 to the respective solenoids 118, 119 to ground. Thus, when contact 121 is moved to engage either of the contacts 122 or 123, the motor 66 is energized to drive the fluid pump 67.

As mentioned hereinbefore, when the fluid pressure within the pipe 75 builds up to a predetermined value due to the pistons of either jack reaching the limit of their movements, switch 76 is actuated to the open position to deenergize solenoid 128 which opens contactor 127, thereby deenergizing the motor, although contact 121 is in engagement with either of the fixed contacts 122, 123.

The circuits for either of the solenoids 118, 119 are maintained as long as the contact 121 is engaged with the contacts 122, 123, respectively, by a circuit around the pressure responsive switch 76 by way of a wire 140 connected to wires 130, 135.

It will be apparent that when the switch contact 121 is in its neutral position, the pistons of both jacks will be in their raised positions, and should it be desirable to raise the front wheels of the automobile, contact 121 is merely moved to contact 122 causing motor 66 and solenoid 118 to be energized whereby fluid is pumped through pipe 62 to the cylinder 24 of jack 22. At the same time, fluid is directed through pipe 79 to the hydraulic motor 80 which moves the brake pedal 16 to its brake applying position. When the pistons of the jacks 22 and 23 reach their fully extended positions, the pressure in the pipe 75 immediately increases to a value to operate the switch 76, thereby causing the motor 66 to be deenergized. The check valve 74 prevents back flow of the hydraulic liquid in the pipes 62, 79 so that the jack is retained in its extended position and motor 80 maintains the brake pedal 15 in its brake applying position. It will be noted that the pressure at which the switch 76 opens is somewhat in excess of the pressures in the hydraulic system required to lift the vehicle.

When it is desired to lower the front end of the car, the contact 121 is moved to its neutral position, whereupon solenoid 118 is deenergized and valve 78 is actuated to connect the cylinder of the particular jack operated with the exhaust return pipe 110, thereby permitting the pistons of the jack to collapse or telescope within the cylinder.

The operation of the rear jack 23 is effected in a manner similar to that described except that contact 121 is engaged with contact 123. As with the operation of the front jack, the hydraulic motor 80 is operated to maintain the brake pedal 15 in its applied position while the jack is in operation.

Alternatively, the hydraulic motor 80 could be omitted and the brake pedal maintained depressed by different mechanism such as that shown in Fig. 7. This mechanism comprises an inverted U-shaped frame or bail 145 having inturned end portions 146 which are pivoted in brackets 147 attached to the floor of the automobile above the brake pedal. The yoke of the bail has an opening into which a thumb screw 148 is threaded which screw has a presser plate 150 swivelly attached thereto adapted to engage the tread of the pedal. The bail is normally maintained upright in its inoperative position, as shown in full lines, by a friction clip 151 attached to the forward or fire wall of the automobile and receiving one leg of the bail. The bail 145 is adapted to be lowered from the clip 151 to a position in which the presser plate 150 is in registration with the foot plate of the brake pedal, and the thumb screw 148 is then rotated to cause the presser plate to engage and depress the pedal. It will be apparent that the foot brakes may be applied for any period desired.

It will be seen that by the present invention an automobile is provided having jacks permanently attached thereto, either as original or accessory equipment, and brakes automatically applied with operation of the jacks to prevent accidental movement of the automobile while elevated by one of the jacks. The power required to operate the jacks is furnished by the automobile battery so that exertion by the car operator is unnecessary and complete control is effected merely by turning a switch.

While in the form of the invention shown, only one jack is provided at each end of the automobile, it is to be understood that more jacks could be employed. For example; a jack could be provided adjacent to each corner of the frame for lifting the wheels individually, and in combination with appropriate control valves. Alternatively the jacks could be operated simultaneously to lift all wheels of the automobile at the same time. While the preferred embodiment of the invention has been shown and described in considerable detail the invention is not limited to the particular constructions shown but may be otherwise incorporated and it is my intention to hereby cover all modifications and uses which come within the practice of those skilled in the art to which it relates and within the spirit and scope of the appended claims.

Having thus described my invention, I claim:

1. In an automotive vehicle, front and rear mounted hydraulic jack means attached to the vehicle and selectively operative to raise the respective ends of the vehicle from the ground, a source of fluid pressure including an electric motor-driven pump, solenoid operated valve means for selectively connecting said hydraulic jack means to said source of fluid pressure, a mechanical interlock in said valve means whereby operation of said valve means to simultaneously connect a plurality of said hydraulic jack means with said source of fluid pressure is impossible, means including a multiposition key controlled electric switch for initiating operation of said motor-driven pump and actuating said valve means to connect a selected one of said hydraulic jack means with said source of fluid pressure, and means responsive to a predetremined fluid pressure for terminating operation of said motor-driven pump.

2. In an automotive vehicle having a braking system including a brake actuating pedal, hydraulic jack means attached to the vehicle and operative to raise a part of the vehicle from the ground, power means to provide fluid pressure to actuate said jack means, a hydraulic motor to actuate said pedal comprising a cylinder, a piston reciprocable in said cylinder and a plunger operatively connected with said pedal and adapted to be moved in one direction by said piston, means forming a lost motion connection between said piston and plunger whereby said plunger may move with said pedal independently of said piston, and control means to substantially simultaneously direct fluid under pressure to said jack means and the cylinder of said hydraulic motor means.

References Cited in the file of this patent

UNITED STATES PATENTS

| 1,416,338 | Denham | May 16, 1922 |
| 1,538,167 | Chappell et al. | May 19, 1925 |
| 1,560,460 | Yates et al. | Nov. 3, 1925 |
| 1,674,249 | Johnson | June 19, 1928 |
| 1,698,612 | Todd et al. | Jan. 8, 1929 |
| 1,769,534 | Nattrass | July 1, 1930 |
| 1,937,457 | Wuebben et al. | Nov. 28, 1933 |
| 2,035,336 | Oliver | Mar. 24, 1936 |
| 2,257,108 | Cornwell | Sept. 30, 1941 |
| 2,388,002 | Maiwald | Oct. 30, 1945 |
| 2,444,272 | Sragal | June 29, 1948 |
| 2,448,054 | Seckel | Aug. 31, 1948 |
| 2,472,294 | Hall | June 7, 1949 |